US009531264B2

(12) United States Patent
Ryan et al.

(10) Patent No.: US 9,531,264 B2
(45) Date of Patent: Dec. 27, 2016

(54) AUXILIARY RECHARGE

(71) Applicant: Power Integrations, Inc., San Jose, CA (US)

(72) Inventors: Paul Ryan, Cambridgeshire (GB); Johan Piper, Cambridgeshire (GB)

(73) Assignee: Power Integrations, Inc., San Jose, CA (US)

( * ) Notice: Subject to any disclaimer, the term of this patent is extended or adjusted under 35 U.S.C. 154(b) by 322 days.

(21) Appl. No.: 14/184,073

(22) Filed: Feb. 19, 2014

(65) Prior Publication Data

US 2014/0232187 A1 Aug. 21, 2014

Related U.S. Application Data

(60) Provisional application No. 61/767,023, filed on Feb. 20, 2013, provisional application No. 61/888,778, filed on Oct. 9, 2013.

(51) Int. Cl.
*H02M 3/156* (2006.01)
*H02M 3/335* (2006.01)
*H02M 1/00* (2006.01)

(52) U.S. Cl.
CPC ..... *H02M 3/156* (2013.01); *H02M 2001/0006* (2013.01); *Y10T 307/344* (2015.04)

(58) Field of Classification Search
CPC .................................................. H02M 3/335
USPC ....................................................... 307/140
See application file for complete search history.

(56) References Cited

U.S. PATENT DOCUMENTS 7,636,246 B2   12/2009  Huynh et al.
2007/0030704 A1*  2/2007  Ramabhadran ... H02M 3/33507
                                                          363/21.01

OTHER PUBLICATIONS

"THX [Switching Power Controller IC] Datasheet", [online]. [archived on Feb. 21, 2014]. {Retrieved from the Internet: <URL: https://web.archive.org/web/20140101000000*/http://www.bbs.dianyuan.com/ bbs/u/55/1330441183681758.pdf> >, (2014), 1-21.
"UCC28610—Green-Mode Flyback Controller Datasheet", © 2012 Texas Instruments, (2012), 41 pgs.
(Continued)

*Primary Examiner* — Robert Deberadinis
(74) *Attorney, Agent, or Firm* — Blakely Sokoloff Taylor & Zafman LLP

(57) ABSTRACT

The present invention generally relates to powering a switching controller of a switch mode power converter (SMPC), and more particularly to a method of providing power to a switching controller of a SMPC, to a charging circuit for supplying charge to a charge store for providing power to a switching controller of a SMPC, and to an SMPC comprising such a circuit. A method of providing power to a switching controller of a switch mode power converter (SMPC), the SMPC having: an inductive component having a winding coupled to receive power from an input to said SMPC; a switching circuit comprising first and second switching transistors, said first transistor coupled in series between said winding and said second transistor; a switching controller to control switching of said second transistor; and a charge store to provide power to said switching controller, the method comprising: flow of current from said winding through said first transistor; and diverting said current through a conduction path to said charge store.

30 Claims, 7 Drawing Sheets

(56) References Cited

OTHER PUBLICATIONS

Hu, Chenming, "Chapter 8: Bipolar Transistor", *In: Modern Semiconductor Devices for Integrated Circuits*, [online]. [retrieved on Feb. 13, 2009]. Retrieved from the Internet: <URL: http://www.eecs.berkeley.edu/~hu/Chenming-Hu_ch8.pdf>, (2009), 291-323.

Van Zeghbroeck, B. J., "Chapter 5: Bipolar Junction Transistors", *In: Principles of Semiconductor Devices* [online]. [retrieved on Feb. 20, 2014]. Retrieved from the Internet: <URL: http://ecee.colorado.edu/~bart/book/book/chapter5/ch5_6.htm>, (Dec. 2004), 1-6.

"AP3776 Advance Datasheet: Low Power Off-line Primary Side Regulation Controller", BCD Semiconductor Manufacturing Limited, Rev. 1.3, Sep. 2013, 14 pages.

\* cited by examiner

AUXILIARY RECHARGE

RELATED APPLICATIONS

This application claims priority under 35 U.S.C. 119(e) to U.S. Provisional Application No. 61/767,023, filed Feb. 20, 2013; and to U.S. Provisional Application No. 61/888,778, filed Oct. 9, 2013, which applications are incorporated herein by reference in their entirety.

FIELD OF THE INVENTION

The present invention generally relates to powering a switching controller of a switch mode power converter (SMPC), and more particularly to a method of providing power to a switching controller of a SMPC, a storage medium storing instructions to cause a programmable processing apparatus to become operable to perform the method, to a charging circuit for supplying charge to a charge store for providing power to a switching controller of a SMPC, to an SMPC comprising such a circuit, and to a storage medium storing code operable to control transistor switching to enable charging of a charge store to power a switching controller of an SMPC.

BACKGROUND TO THE INVENTION

The use of a low cost bipolar junction transistor (BJT) for the primary switch in an offline power converter is desirable, since it provides both high breakdown voltage and low on-state voltage. However, a disadvantage suffered by the BJT when compared to a voltage-controlled MOSFET, IGBT, etc., is the comparatively large reservoir of charge needed during the start-up procedure.

Typically a reservoir capacitor $C_{Aux}$ is charged from the rectified mains input to an initialisation voltage; it then provides all of the charge, as an auxiliary supply, to both power the IC controller and drive the BJT, until a bias winding voltage rises sufficiently to take over these roles. If the initialisation charge in $C_{Aux}$ does not power the IC and BJT for long enough to raise the bias winding voltage to its operational level, the power converter will fail to start. Loads having a high input capacitance are a particular challenge, as they present an effective short circuit in a 'cold start' situation; more switching cycles are therefore required to raise the output and bias winding voltages. A BJT requires significantly more charge to turn on than does a voltage-controlled device, so the charge reservoir runs down more quickly. A larger reservoir capacitance requires a higher start-up current, which can increase power consumption. Operating with a higher reservoir voltage provides more charge to support start-up for a given reservoir capacitance, and also provides more headroom for driving devices in the IC. However it also increases power consumption due to dissipation losses.

Other operating conditions may similarly raise technical issues. The bias winding voltage is generally closely related to the converter output voltage, so when the output voltage is low there may be insufficient controller IC bias power. This may occur, for converters operating in constant current or constant power output modes, when a low impedance load causes the output voltage to drop. Although this problem does occur for MOSFET-based converters, the large current required by a BJT exacerbates it considerably.

Thus, with regard to an offline power converter employing for example a BJT as primary switch, improvements are desired in relation to efficient operation and/or generally in relation the effective supply of charge to the controller IC by conventional means.

In view of the above, the field of SMPCs continues to provide a need for improved control over the supply of operating current to IC controllers of power converters, for example cascode power converters comprising bipolar or field effect primary switches.

For use in understanding the present invention, the following disclosures are referred to:

- U.S. Pat. No. 7,636,246 (Inventors Huynh et al, assignee Active-Semi, Inc.), corresponding to US20070891397 published Feb. 12, 2009;
- UCC28610 datasheet, available from Texas Instruments at http://www.ti.com/product/ucc28610; and
- THX202H datasheet, available from: http://bbs.dianyuan.com/bbs/u/55/1330441183681758.pdf;

SUMMARY

According to a first aspect of the present invention, there is provided a method of providing power to a switching controller of a switch mode power converter (SMPC), the SMPC having: an inductive component having a winding coupled to receive power from an input to said SMPC; a switching circuit comprising first and second switching transistors, said first transistor coupled in series between said winding and said second transistor; a switching controller to control switching of said second transistor; and a charge store to provide power to said switching controller, the method comprising: establishing a flow of current from said winding through said first transistor; and diverting said current through a conduction path to said charge store.

Thus, an embodiment may provide an alternative or additional means for maintaining sufficient power to the switching controller, preferably regardless of output voltage and/or load of the SMPC, which is preferably a cascode power converter. This may be achieved in an embodiment by using BJT emitter or MOSFET source current to provide power for a converter controller IC during a switching cycle, for example during normal (e.g., PWM-controlled) operation, i.e., when the SMPC is providing power to the load, after a start-up of period the SMPC.

Regarding more specific advantages, an embodiment may: reduce constraints on auxiliary charge circuit design; allow a switching controller to maintain control at very low output voltages; broaden utility of BJT-based converters; and/or improve start-up characteristics.

Preferably, the power provided to the switching controller is DC (direct current). Similarly, the SMPC is preferably for providing a DC output voltage to a load. A load on the SMPC may be, e.g., inductive, resistive and/or capacitive. The inductive component may for example be a transformer having a primary winding coupled to receive the power from an input to said SMPC, and a secondary winding coupled to provide power for an output voltage to a load. However, the SMPC may be a non-isolated converter in an alternative embodiment.

As inferred above, the switching circuit is preferably a cascode circuit, wherein the first transistor is coupled between the winding and a second transistor to form a cascode arrangement, the second transistor preferably connected to a reference voltage line, e.g., ground. Nevertheless, in such an arrangement, the cascode circuit does not necessarily comprise the first and second transistors coupled directly to each other, the first transistor coupled directly to the winding and/or the second transistor directly to a reference voltage line. For example, the first and second transistors may have components connected between them, e.g. a current sense resistor, placed between the winding and/or transistors or between the second transistor and the reference voltage line. In a cascode arrangement, the second transistor may be coupled to controllably drive, i.e., emitter- or source-switch, the first transistor and thereby control current in said winding. However, it is noted that conduction of the first transistor directly controls current in the winding. It is further noted that, the first transistor may stay on when the second turns off—conduction by the first transistor (with current exiting either of the emitter or base terminals) advantageously defining the period during which current is switched through the inductive component.

While the first transistor is in embodiments typically a power transistor, the second transistor may be a power transistor or a low voltage device.

There may further be provided the method, comprising inhibiting receiving on a control line of said first transistor a bias signal, said bias signal for outputting a charge to said first transistor. Notably, the first and second transistor on-times are generally not coincident in an embodiment. Thus, considering an embodiment, a time interval defining when the bias signal biases the first transistor on may not be the same time interval as that of the second transistor being on and/or that of the current flow flowing.

Alternatively, one could maintain base drive or gate bias during flow of current. Nevertheless, where such inhibiting is performed, the diverted flow of current preferably flows during substantially the full time extent of the inhibiting, or shorter, for example as long as the first power switch stays on during the inhibiting. Advantageously, inhibiting alone does not cause the first transistor to immediately stop conducting current from the inductive component.

An embodiment may divert the current to the charge store to perform auxiliary recharge in any switching cycle, regardless of what mode the SMPC may be in. In embodiments, start-up typically consists of an initial phase when the charge store, e.g. capacitor, is being charged from a DC source (e.g. a low current from rectified Vht through a large resistor Rstart or a normally-on start-up switch). Preferably, the controller IC is still asleep, hence no switching occurs. Once the voltage on the charge store ('auxiliary voltage') reaches a threshold the IC wakes up and instructs switching to begin. This is generally when the SMPC output voltage begins to rise. Auxiliary recharge can be performed during this rise to help keep the IC awake while it 'pulls up' the load, while the SMPC may still be in its start-up phase. Thus, auxiliary recharge can be performed in any switching cycle, including during and/or after converter start-up. More specifically, auxiliary recharge may be used in an embodiment during normal SMPC operation, i.e., after cold-start, and/or during an SMPC output voltage rise phase of start-up.

Thus, there may generally be provided the method, wherein said flow and diverting occur during a switching cycle of said switching circuit, said switching cycle for allowing (preferably enabling) outputting of said power for said output voltage to said load; such a switching cycle may comprise a single on-off cycle of the second transistor and a single conducting-non-conducting cycle of the first transistor. Thus, the flow and/or diverting for auxiliary recharge may occur during normal operation of the SMPC. Additionally or alternatively, auxiliary recharge may occur during start-up of the SMPC Consistent with the above, auxiliary recharge during startup—for example once switching has begun, but before the aux winding voltage is sufficiently high, e.g., has reached a threshold,—is desirable.

Further preferably, the flow and/or diverting occur during a PWM switching mode of control of the switching circuit.

There may further be provided the method, wherein the first transistor stores charge to maintain said first transistor on during said diverting said current flow, and preferably during any inhibiting of receiving a bias signal as described above.

There may further be provided the method, wherein a capacitor external to the first transistor stores charge to maintain said first transistor on during said diverting said current flow, and preferably during any inhibiting of receiving a bias signal as described above.

There may further be provided the method, wherein a bias circuit connected to a control line of said first transistor maintains said first transistor on during said diverting said flow of current. Thus, a DC base/gate bias embodiment wherein the above inhibiting does not occur may be provided.

There may further be provided the method, wherein said diverting comprises turning said conduction path on to conduct said current through said conduction path to said charge store. This may comprise turning on a switch in the conduction path or forward biasing a diode in the conduction path. In embodiment, the turning on of the conduction path may in itself allow the diversion of the current flow.

There may further be provided the method, wherein said diverting comprises: decoupling a reference voltage line from said conduction path, to thereby allow flow of said current through said conduction path to said charge store. For example, the diverting may comprise turning the second power switch off to decouple the first power switch from a reference voltage and thereby allow a current flow of the first transistor (e.g., emitter or source current) to be diverted to the charge store. In an embodiment, the decoupling of the first power switch from the reference voltage may cause a voltage change on said first power switch relative to said charge store to thereby allow flow of said current to said charge store, e.g., voltage change on the first power switch forward biases a semiconductor junction diode to allow current flow through the diode to the charge store; alternatively a switch in the conduction path may be used to allow the voltage change.

There may further be provided the method, wherein said decoupling comprises switching said second transistor off while said first transistor is on.

There may further be provided the method, wherein at least the first transistor is a bipolar transistor, e.g., BJT, IGBT, etc., and wherein said diverting comprises diverting emitter current of the bipolar transistor to flow through the conduction path to the charge store.

There may further be provided the method, wherein said at least the first transistor is a field effect transistor (FET), e.g., JFET, MOSFET etc., and wherein said diverting comprises diverting source current of the FET to flow through the conduction path to the charge store. Preferably, the above decoupling of a reference voltage line from the conduction path comprises switching the second transistor off to decouple the FET source terminal from the reference voltage line, the switching the second transistor off occurring while the first transistor is on such that source current of the FET flows to the charge store.

There may further be provided the method, wherein the inductive component is a transformer or coupled inductor, the method preferably further comprising charging said charge store from an auxiliary winding of said transformer or coupled inductor.

There may further be provided the method, wherein said switching controller controls switching of said first transistor.

There may further be provided a storage medium storing computer program instructions to program a programmable processing apparatus to become operable to perform the method.

According to a second aspect of the present invention, there is provided a charging circuit for supplying charge to a charge store for providing power to a switching controller of a switch mode power converter (SMPC), the SMPC comprising: an inductive component having a winding coupled to receive power from an input to said SMPC; a switching circuit comprising first and second switching transistors, said first transistor coupled in series between said winding and said second transistor and to receive a winding current wherein said winding current is a current derived from said winding; a switching controller to control switching of said second transistor; and a charge store coupled to provide power to said switching controller, the charging circuit comprising: a current diversion circuit to conduct a said winding current from the first transistor to said charge store; and said second transistor arranged to controllably decouple a reference voltage line from said current diversion circuit to allow said winding current to flow through said current diversion circuit to said charge store.

Similarly as for the first aspect, the supplying charge to a charge store for providing power to a switching controller of the SMPC preferably occurs during 'normal' operation and/or during start-up.

The current diversion circuit may alternatively be referred to as a conduction path, and/or the charge store may alternatively be referred to as a charge reservoir. Generally, the charge store comprises at least a capacitor.

The second transistor may be a reference decoupling switch operable to substantially turn off to allow voltage change on a terminal of the first transistor (e.g. BJT emitter or MOS source) relative to voltage on the charge store, to thereby allow current flow toward the charge store, in particular where forward-biasing of a diode in the current diversion circuit is required to turn on a conduction path to the store.

There may further be provided the charging circuit, comprising a bias decoupling switch to controllably substantially decouple a control line of said first transistor from a bias output line (preferably an output line of the switching controller), the bias output line for outputting a charge to said first transistor. Thus, the bias line may generally be for controllably supplying charge to the first transistor control terminal. In an embodiment, the bias line is only used to bias the first transistor on for some of the first transistor's on-time, which may not be exactly the same time interval as the second transistor's on-time.

There may further be provided the charging circuit, wherein the first transistor is arranged to store charge for delaying turn-off of the first transistor when the control line of said first transistor is decoupled from the bias output line by said bias decoupling switch such that the first transistor conducts said winding current to said current diversion circuit. The charge control model provides some insight into this charge storage effect. For example, a clear description of BJT switching using the charge control model can be found at http://eceecolorado.edu/~bart/book/book/chapter5/ch5_6.htm; a visual analogy is given in Section 8.10 of Chenming Hu's Modern Semiconductor Devices for Integrated Circuits (http://www.eecs.berkeley.edu/~hu/Chenming-Hu_ch8.pdf). Such citations may assist understanding of a BJT charge storage mechanism, the capacitance of which may change with BJT operating conditions. Advantageously, such charge storage by the first transistor for delaying the turn-off is achieved internally or intrinsically in the first transistor (e.g. in the base region of the BJT; in the gate capacitance of MOSFET).

Additionally or alternatively, there may further be provided the charging circuit, wherein a capacitor external to the first transistor is arranged to store the charge for delaying turn-off of the first transistor when the control line of said first transistor is decoupled from the bias output line by said control decoupling switch or bias decoupling switch such that the first transistor conducts said winding current to said current diversion circuit. Such a capacitor may be a discrete capacitor and used alone or in conjunction with an internal or intrinsic capacitance of the first transistor for the purpose of delaying the turn-off.

There may further be provided the charging circuit, wherein said current diversion circuit comprises a semiconductor junction, e.g., diode, configured to conduct said diverted winding current when forward-biased.

There may further be provided the charging circuit, wherein said current diversion circuit comprises a switch, e.g., e.g. BJT or MOSFET, operable to turn on to conduct said diverted winding current.

There may further be provided the charging circuit, wherein at least the first transistor is a bipolar transistor, and wherein: said second transistor is operable to decouple the bipolar transistor emitter terminal from the reference voltage line (e.g., a ground rail) while the bipolar transistor is on, to thereby divert emitter current of the bipolar transistor through the current diversion circuit (e.g., comprising a diode and/or a switch) to the charge store.

There may further be provided the charging circuit, wherein at least the first transistor is a field effect transistor (FET, e.g., MOSFET), and wherein: said second transistor is operable to decouple the FET source terminal from the reference voltage line while the FET is on, to thereby divert source current of the FET through the current diversion circuit to the charge store.

There may further be provided an SMPC comprising the charging circuit.

There may further be provided the SMPC, wherein the inductive component comprises a transformer or coupled inductor and said charge store comprises a capacitor configured to receive charge from an auxiliary winding of said transformer or coupled inductor.

The SMPC may be, e.g., a forward, flyback, buck, boost or buck-boost converter.

According to a third aspect of the present invention, there is provided a charging circuit for supplying charge to a charge store for providing power to a switching controller of a switch mode power converter (SMPC), the SMPC having: an inductive component having a winding coupled to receive power from an input to said SMPC; a switching circuit comprising first and second switching transistors, said first transistor coupled in series between said winding and said second transistor; a switching controller to control switching of said second transistor; and a charge store to provide power to said switching controller, the charging circuit comprising: means for conducting current from said winding through said first transistor; and means for diverting said current through a conduction path to said charge store.

Similarly as for the first and second aspects, the supplying charge to a charge store for providing power to a switching controller of the SMPC preferably occurs during 'normal' operation and/or during start-up.

There may further be provided the charging circuit, the charging circuit comprising means for inhibiting receiving on a control line of said first transistor a bias signal for outputting charge to said first transistor.

There may further be provided the charging circuit, wherein said means for conducting current is for conducting current from said winding through said first transistor during said inhibiting, for example at least as long as the first power switch stays on during any inhibiting as described above.

According to a fourth aspect of the present invention, there is provided a storage medium storing code operable to control transistor switching to enable charging of a charge store to power a switching controller of a switch mode power converter (SMPC), the SMPC comprising primary and secondary transistors and a winding, the secondary transistor coupled between the primary transistor and a reference voltage, the code to, when running: control the primary and secondary transistors on to allow conduction of a current from the winding to the reference voltage; then turn off the secondary transistor while allowing the primary transistor to remain on, to thereby allow diverting of current from said primary transistor through a conduction path to a said charge store. In an embodiment, the storage medium may be the switching controller.

Preferred embodiments are defined in the appended dependent claims.

Any one or more of the above aspects and/or any one or more of the above optional features of the preferred embodiments may be combined, in any permutation.

BRIEF DESCRIPTION OF THE DRAWINGS

For a better understanding of the invention and to show how the same may be carried into effect, reference will now be made, by way of example, to the accompanying drawings, in which.

DETAILED DESCRIPTION OF PREFERRED EMBODIMENTS

An embodiment uses BJT emitter or MOSFET source current to provide power for the converter controller IC during a switching cycle. More specifically, a preferred embodiment having a relatively minimal arrangement for achieving auxiliary recharge comprises: a cascode converter with a switched connection from BJT emitter or MOSFET source to an auxiliary charging line and a switched connection from BJT emitter or MOSFET source to 'ground', the latter to be opened while the BJT or MOSFET is conducting to provide current through the former.

Preferably, an embodiment supplies operating current to a switching controller by a complementary means from the conventional 'Aux winding'.

Figure 1:
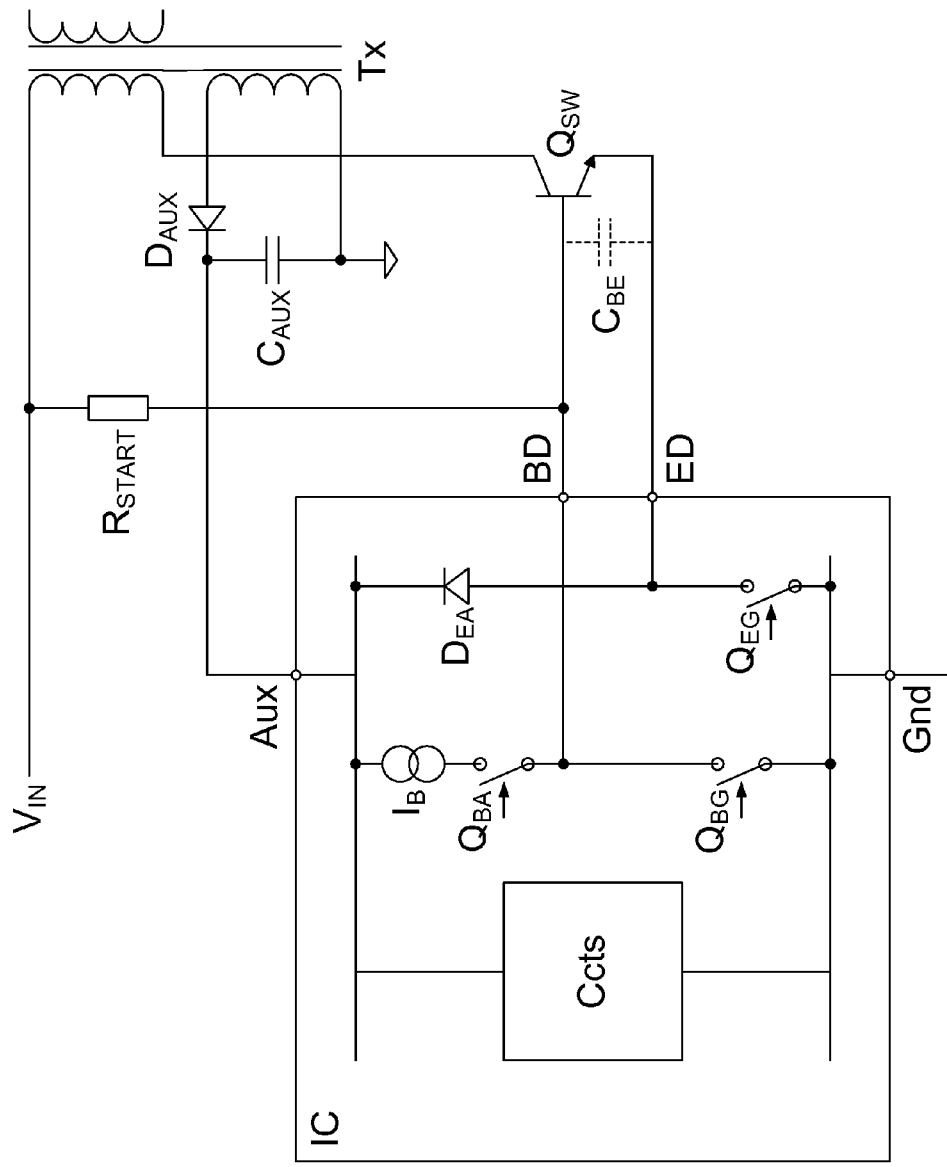
FIG. 1 shows a circuit schematic of a first embodiment.

FIG. 1 shows a circuit schematic of a first embodiment for auxiliary recharge. The offline power converter may be of any type, for example flyback, boost or forward converter, and is shown here merely by way of example as a single-ended design. Whilst a transformer Tx is illustrated in FIG. 1, alternative inductive components may be employed, depending on the converter type and the nature of the application. For example a flyback converter may employ a coupled inductor, and a boost converter may employ an inductor. Some or all of switches $Q_{BA}$, $Q_{BG}$ and $Q_{EG}$, and diode $D_{EA}$, may be integrated into an IC Controller, as illustrated in FIG. 1. This approach may minimise the overall parts count for a power converter. Alternatively some or all of these devices may be discrete components, for example in order to reduce power dissipation in, and/or the die size of, the IC. They may be formed in any appropriate manufacturing process. Connection between the ED and Aux terminals may be provided by a controllable switch $Q_{EA}$ rather than by diode $D_{EA}$. Switches $Q_{BA}$, $Q_{BG}$ and $Q_{EG}$ (and $Q_{EA}$ if present) may be controlled by circuits comprising circuits ("Ccts"), some or all of which may be integrated into the IC controller. Alternatively any or all of the control circuitry of FIG. 1, for example circuitry of "Ccts" or current source $I_B$, may be embodied as discrete components.

In this embodiment, the primary switch $Q_{SW}$ is a bipolar transistor, for example a bipolar junction transistor (BJT), connected in the cascode, or emitter-switched, configuration. A capacitance $C_{BE}$ is shown between the base and emitter terminals of the BJT $Q_{SW}$ in dashed lines. This represents the sum of the intrinsic charge storage in the BJT and any additional capacitance provided between these terminals. $Q_{EG}$ is a low voltage, high current switch on the IC, controlling $Q_{SW}$ emitter current to a reference voltage, here chosen to be 0 V (Gnd). Among benefits of employing the cascode arrangement are: Fast switching—both on and off—due to $Q_{EG}$ being a low voltage device; high voltage withstanding capability with an advantageous reverse-bias safe operating area (RBSOA); and/or low no-load power consumption due to the ability to use the gain of $Q_{SW}$ to generate start-up current. At start-up, a small current from $V_{IN}$ through start-up resistor $R_{START}$ causes the $Q_{SW}$ base voltage to rise, biasing $Q_{SW}$ to conduct collector-emitter current. This current, which is larger than the base current flowing through $R_{START}$ by a factor of the $Q_{SW}$ gain, flows via diode $D_{EA}$ to the IC's charge reservoir $C_{AUX}$ (since switches $Q_{BA}$, $Q_{BG}$ and $Q_{EG}$ are open). $R_{START}$ may thus be chosen to have a relatively large value, for example around 40 MΩ, allowing power dissipation in $R_{START}$ to be reduced.

Instead of biasing the base terminal of a BJT in the cascode configuration to a DC voltage to ensure conduction when the emitter switch $Q_{EG}$ is closed, the present embodiment employs switching of the $Q_{SW}$ base terminal to more precisely control operation of the BJT: the $Q_{SW}$ base terminal is connected to a low reference voltage, chosen to be Gnd in FIG. 1, via switch $Q_{BG}$. The $Q_{SW}$ base terminal is also connected to a source of current $I_B$ via switch $Q_{BA}$. $I_B$ may be an active current source or simply a resistor connected to a voltage source, such as the Aux (auxiliary) rail.

Advantageously, this switched base and emitter approach may retain the reliability benefit of open emitter switching inherent to the cascode arrangement but also limiting the peak voltage excursion of the emitter during turn off. With the emitter terminal open there is generally no opportunity for current gain in the BJT provided that the peak emitter voltage does not cause any current flow into connected circuits (e.g. $D_{EA}$). Without opportunity for emitter current flow, the BJT can withstand higher collector voltages during and immediately following turn-off without adverse breakdown that could degrade power efficiency and reliability. A practical result may be that, with appropriate switch control, the BJT's applicable breakdown voltage can be higher in this configuration compared to configurations that are only base-switched or only emitter-switched. This may add a cost advantage to the base+emitter switched arrangement.

Figure 2:
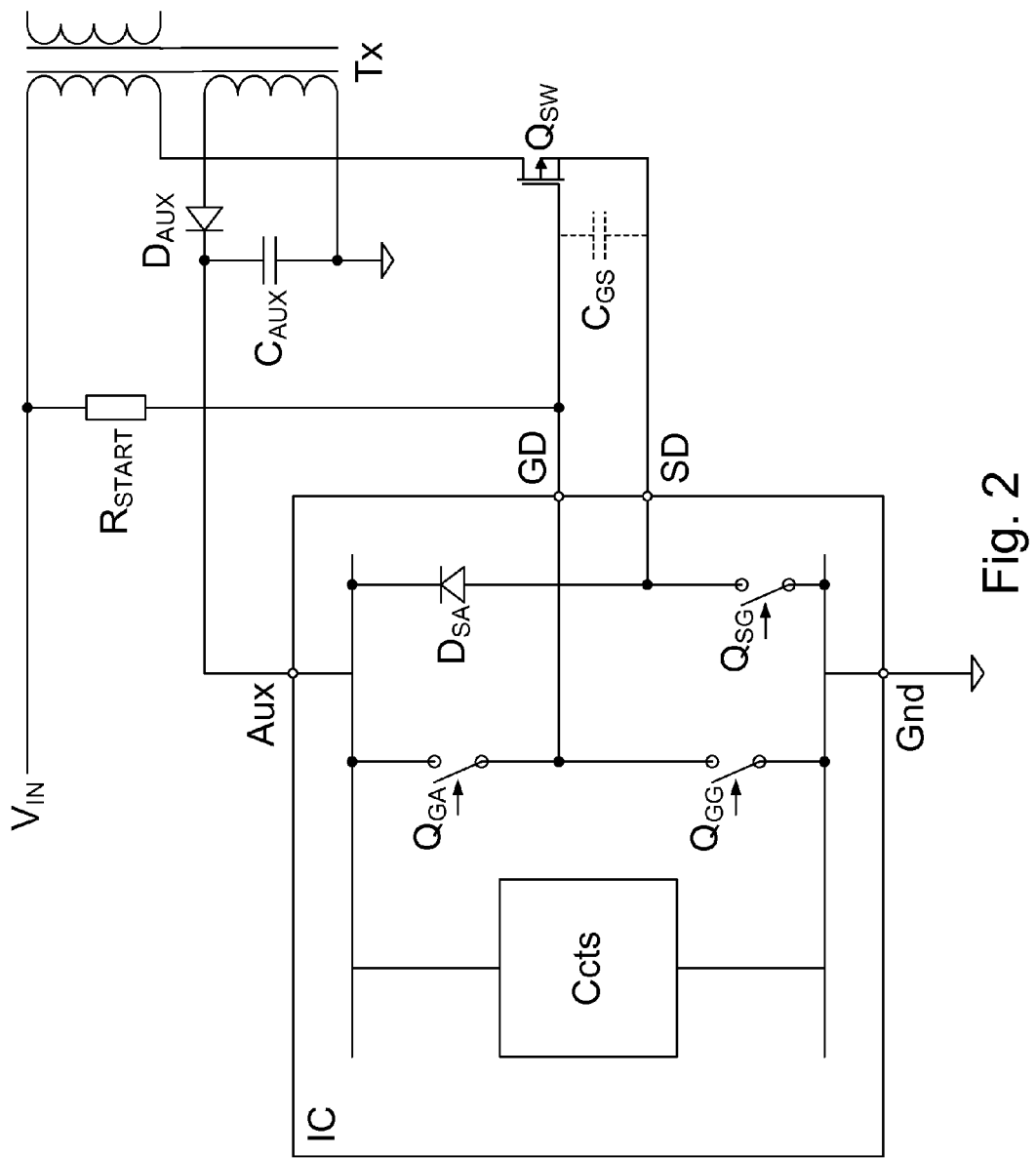
FIG. 2 shows a circuit schematic of a second embodiment.

With some modifications the same approach may be taken to switch a field effect transistor (FET), for example a metal-oxide-semiconductor FET (MOSFET), as shown in FIG. 2.

In an embodiment based on FIG. 1, the transformer Tx is referred to as an inductive component, which is coupled to receive power from the input VIN. Switches QSW and QEG respectively provide first and second switching transistors of a switching circuit, wherein switching of the second transistor may be controlled by the switching controller 'Ccts', and switching of the first transistor is controlled at least by a bias signal on a control line, e.g., base terminal, of the transistor. A charge store in the form of capacitor CAUX is configured to receive current from a conduction path comprising for example a controllable switch and/or diode DEA, each generally comprising a semiconductor junction to allow forward bias current flow. Thus a current diversion circuit comprising such a conduction path to bleed current from Qsw to Caux may be provided. An additional capacitor CBE external to the first switching transistor Qsw may be provided to assist allowing the first switching transistor Qsw to conduct current that is diverted to the conduction path; however intrinsic capacitance of the transistor Qsw may assist in this regard, with or without the external capacitor. Flow of such current through the conduction path may be enabled by the second transistor QEG decoupling the transistor Qsw from a reference voltage line, e.g., Gnd as shown in FIG. 1.

Further considering FIG. 1, QBA may be referred to as a bias decoupling switch, which is coupled between a bias output line (from, e.g., a current source IB) and an output line to provide a bias signal to the control line (e.g., base) of the first switching transistor Qsw.

Figure 3:
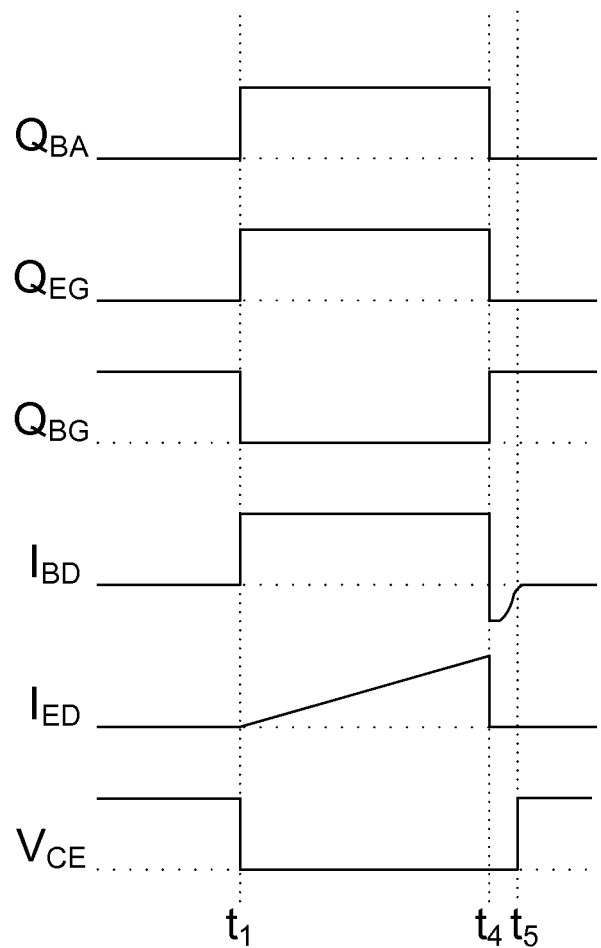
FIG. 3 shows waveforms illustrating an arrangement for a BJT control scheme.

By appropriate control of switches $Q_{EG}$, $Q_{BG}$ and $Q_{BA}$ and of current source $I_B$ a wide range of BJT control techniques may be implemented. An illustration of a basic scheme is provided in FIG. 3 showing, from top to bottom of the drawing, states of switches $Q_{BA}$, $Q_{EG}$ $Q_{BG}$, and variation of $I_{BD}$, $I_{ED}$ and $V_{CE}$, with time points $t_1$, $t_4$ and $t_5$ along the time axis. (noting that nothing is implied by the omission of, e.g., time point $t_2$).

In the arrangement of FIG. 3, the waveforms $Q_{BA}$, $Q_{EG}$ and $Q_{BG}$ illustrate the logic states of those switches, with the higher level representing a switch on state and the lower level representing a switch off state. In this simple example switches $Q_{BA}$ and $Q_{EG}$ are closed (i.e. turned on) simultaneously at time $t_1$, providing base current drive $I_{BD}$ out of IC terminal BD whilst the emitter terminal of $Q_{SW}$ is connected to Gnd. This closes $Q_{SW}$, causing current to flow through a primary winding of transformer Tx to Gnd. Switch $Q_{BG}$ is controlled in opposite phase to $Q_{BA}$ and $Q_{EG}$. When closed at time $t_4$ it provides a low impedance to reverse base current, shown as a negative lobe on base current $I_{BD}$, and asserts a reliable turn-off when $Q_{SW}$ opens at time $t_5$. In this simple example base current from current source $I_B$ is held at a constant value while $Q_{BA}$ is closed. The $Q_{SW}$ emitter current into the IC's ED pin, $I_{ED}$, is illustrated in FIG. 3 as a typical ramping current through the primary winding of the coupled inductor of a flyback converter, merely as a convenient example (embodiments are generally applicable to other converter types, for example forward, boost, buck or other converter topologies). Waveform $V_{CE}$ represents the collector-emitter voltage of BJT $Q_{SW}$, showing the blocking and conduction phases. Note that between times $t_4$ and $t_5$ the primary inductor current continues. Such current may flow to ground as reverse base current, via the IC terminal BD and switch $Q_{BG}$. Hence switch $Q_{BG}$ is preferably capable of conducting currents as large as those conducted by switch $Q_{EG}$.

An embodiment may however provide improved management of $V_{AUX}$, the voltage across IC charge reservoir capacitor $C_{AUX}$. Example waveforms are shown in FIG. 4.

Figure 4:
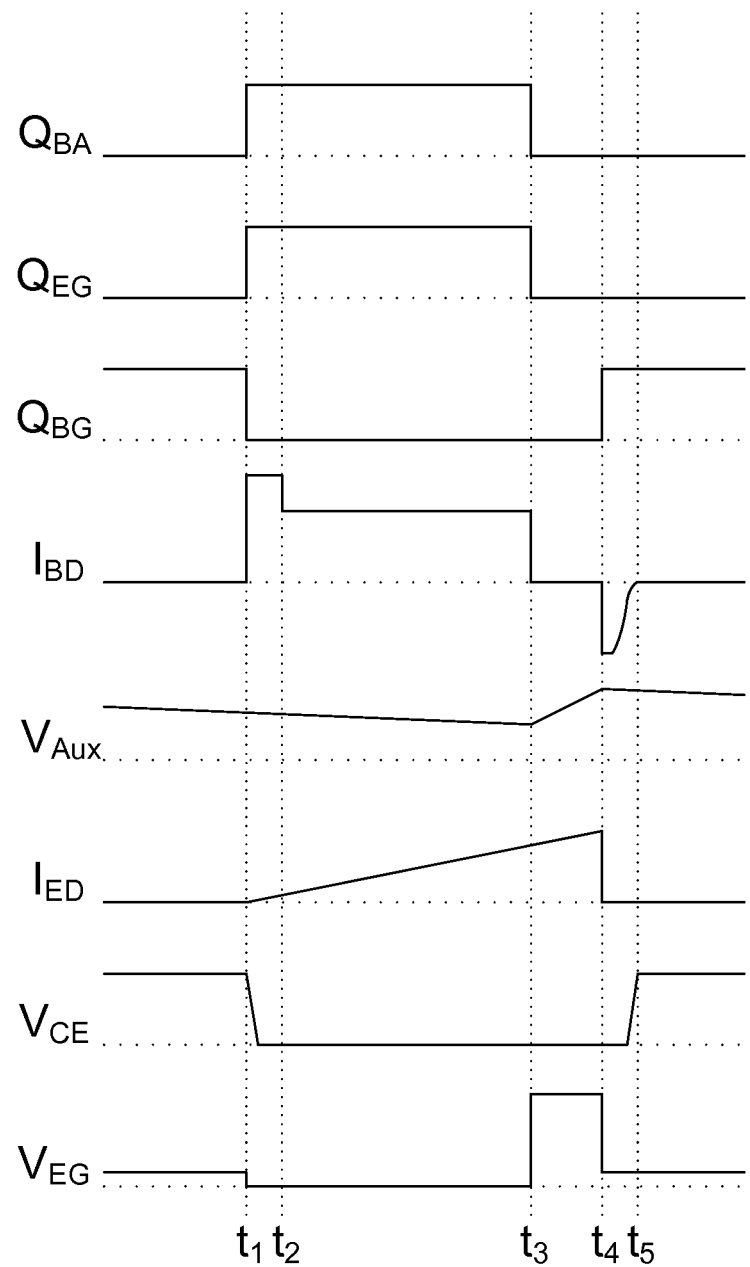
FIG. 4 shows waveforms illustrating a BJT control scheme of an embodiment.

In contrast to the control scheme of FIG. 3, in the BJT control scheme embodiment of FIG. 4, $Q_{EG}$ is opened at a time $t_3$ earlier than $t_4$, while $Q_{BG}$ remains open. With stored charge maintaining $Q_{SW}$ in its on state until time $t_5$, the $Q_{SW}$ emitter terminal voltage rises until diode $D_{EA}$ is forward biased. This forces $Q_{SW}$ emitter current through $D_{EA}$ to $C_{Aux}$, via the Aux terminal of the IC, or directly if a discrete diode $D_{EA}$ is used. In other words, for a controlled period, collector current flows to $C_{Aux}$ rather than to Gnd, providing an alternative source of power to the IC. Because switches $Q_{BA}$, $Q_{EG}$ and $Q_{BG}$ are all open, the $Q_{SW}$ base terminal voltage rises with its emitter terminal voltage, the latter being illustrated in FIG. 4 as $V_{EG}$. The increase in $V_{Aux}$ illustrated in FIG. 4 indicates auxiliary recharging.

Although base drive, i.e. switch $Q_{BA}$ and/or current source $I_{BD}$, is inhibited at time $t_3$ in the scheme of FIG. 4, it may be preferred to continue to drive the base terminal for some or all of the period from time $t_3$ to time $t_4$, whilst $Q_{SW}$ emitter current flows through $D_{EA}$ to $C_{Aux}$. This may require a higher base bias voltage to be applied, due to the rise in the emitter terminal voltage of $Q_{SW}$. Such an increase in base bias voltage may be achieved, for example, by using a voltage converter such as a charge pump between the Aux rail and the $Q_{SW}$ base terminal.

Referring to the MOSFET $Q_{SW}$ embodiment of FIG. 2 and the waveforms of FIG. 4, it is noted that the gate-source voltage established by $Q_{GA}$ and maintained by gate-source capacitance $C_{GS}$ keeps $Q_{SW}$ in conduction whilst switch $Q_{SG}$ is open, since the $Q_{SW}$ gate terminal voltage rises with its source terminal voltage. This is generally true as long as switches $Q_{GG}$ and $Q_{GA}$ remain open.

Although FIG. 4 shows the auxiliary recharge period as occurring after all of the base current has been delivered for that switching cycle, alternative timings may be preferable. For example $Q_{BA}$ and $Q_{EG}$ might be opened after an initial period of base current drive, once $Q_{SW}$ has reached the desired degree of saturation. Further base current may then be applied to $Q_{SW}$ after the auxiliary recharge period, by closing switches $Q_{BA}$ and $Q_{EG}$, to maintain a desired degree of saturation. The amount of charge delivered to $C_{Aux}$ during an auxiliary recharge period depends on the length of the period that $Q_{BG}$ and $Q_{EG}$, and optionally $Q_{BA}$, are open and the amplitude of the $Q_{SW}$ collector current during that period. The timing of auxiliary recharge periods may therefore be optimised for a given application. For example, although the auxiliary recharge period shown in FIG. 4 immediately follows the end of the base drive current, its onset may occur at any time before $t_4$ by delaying the opening of switch $Q_{EG}$.

In the present embodiment, auxiliary recharge can be terminated immediately by closing either or both of switches, $Q_{BG}$ and $Q_{EG}$. For example, for a flyback or forward converter the auxiliary recharge effect is generally greatest if it occurs towards the end of the BJT conduction period, when $Q_{SW}$ collector current is greatest. In higher power converters the auxiliary recharge effect may be sufficient if it occurs earlier in the BJT conduction period; this may also avoid excessive switched current through diode $D_{EA}$.

Although the above description focuses on the switched base and emitter arrangement of FIG. 1, the essence of the technique is applicable to other cascode arrangements. For example an approach employing a DC base voltage bias may also make use of an auxiliary recharge technique, as shown for example in FIG. 5.

Figure 5:
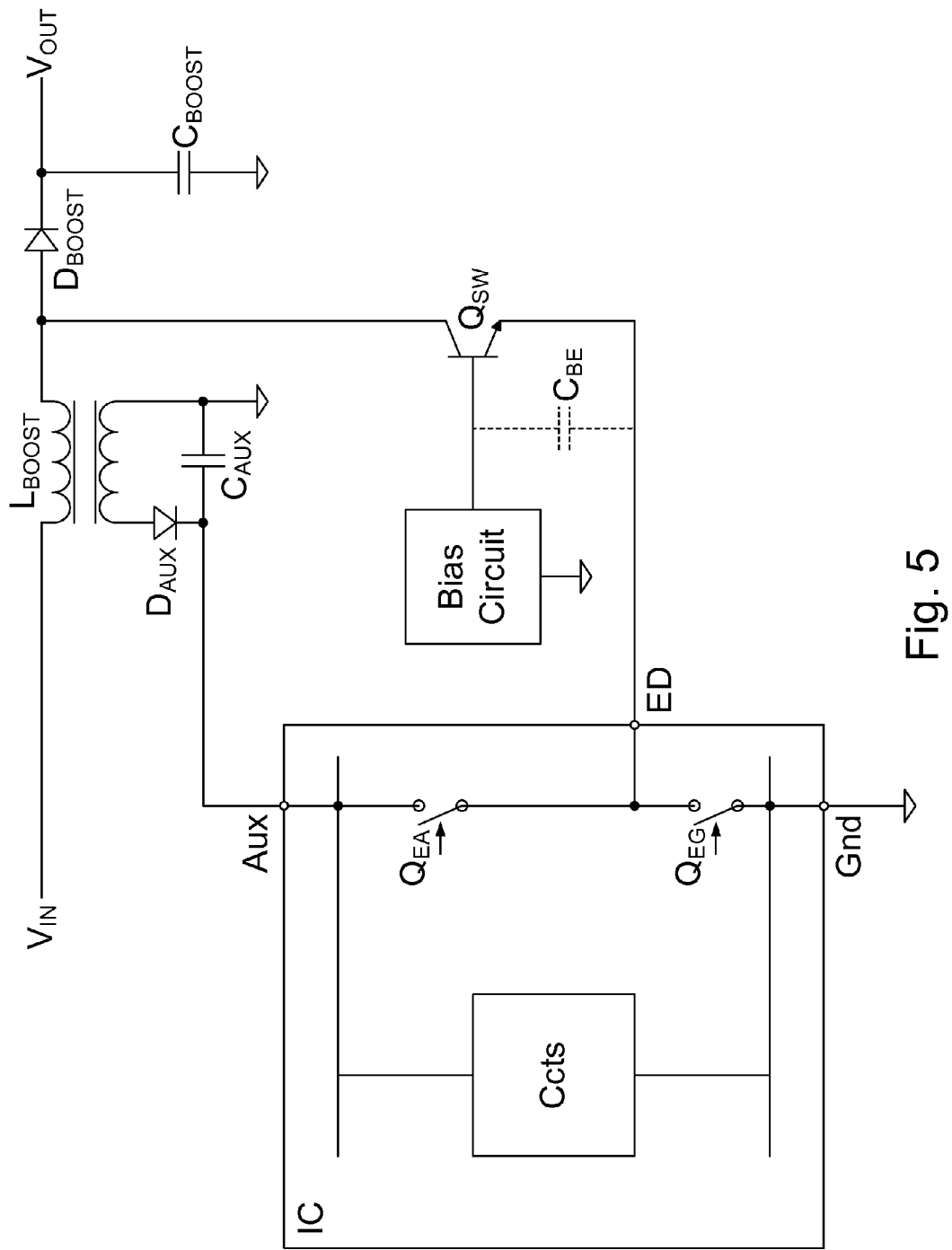
FIG. 5 shows a circuit schematic of a third embodiment employing a DC base voltage bias.

The embodiment of FIG. 5 illustrates an example of auxiliary recharge in the context of a boost converter. Boost inductor $L_{BOOST}$ replaces transformer (or coupled inductor) Tx, and an auxiliary winding is shown as an example power source for the IC. However the embodiment is equally applicable to other converter types already mentioned above. A bias circuit ensures that switch $Q_{SW}$ is maintained on when inductor current is required to flow. Such inductor current may flow either to the low reference voltage (Gnd) via switch $Q_{EG}$ when that switch is closed, or to $C_{AUX}$ via switch $Q_{EA}$ when that switch is closed. During the $Q_{SW}$ on time an auxiliary recharge period may be enabled by opening switch $Q_{EG}$ and closing switch $Q_{EA}$. During auxiliary recharge the $Q_{SW}$ emitter voltage rises a little above that of the Aux capacitor $C_{AUX}$. This provides a guide for the required bias voltage for the $Q_{SW}$ base terminal. In order to turn switch $Q_{SW}$ off, hence stopping inductor current flow, both switch $Q_{EG}$ and switch $Q_{EA}$ are opened.

The bias circuit may comprise any suitable means for providing the required voltage at the control terminal (i.e. base of a BJT or gate of a MOSFET or IGBT) of switch $Q_{SW}$. As such, the bias circuit may comprise combinations of resistive, capacitive and/or inductive components, rectifiers and/or switches, etc. The source of the voltage bias may be any suitable voltage source, for example the mains input voltage $V_{IN}$, a winding associated with the inductive component, and/or a DC voltage source such as a battery.

In any embodiment, by detecting $V_{Aux}$ and comparing it to a reference level, for example using circuits included in "Ccts" in the IC controller of FIG. 1, a decision can be made by the IC controller as to whether an auxiliary recharge period is required in a switching cycle. Such detection and comparison may additionally be used to determine the length and/or timing in the switching cycle of an auxiliary recharge period. Because auxiliary recharge can be controlled it may be used to regulate $V_{Aux}$ to a desired value. A lower voltage, for example 3V, may allow base current to be generated at lower resistive loss compared to typical converters, for which $V_{Aux}$ varies widely—and is generally highest when highest base current is needed.

It is possible in an embodiment to use auxiliary recharge to deliver more charge to $C_{Aux}$ than is taken out for base drive current in each cycle. This is because the current gain of the BJT $Q_{SW}$ multiplies the base current in producing the emitter current, and means that there can be a surplus to operate the controller.

The above generally focuses on one challenging case of BJT-based converters. However, embodiments are generally applicable where the cascode uses field effect, e.g., field effect, e.g., MOSFET, and/or bipolar, e.g. BJT, transistors in any combination. Thus, in alternative embodiments, a MOSFET or an IGBT, rather than a BJT, may be employed as $Q_{SW}$ in a source-switched cascode arrangement. Such an arrangement is illustrated in FIG. 2. In this case the charged gate-source capacitance, rather than accumulated base charge, keeps the MOSFET or IGBT in conduction during auxiliary recharge. Alternatively, a DC gate voltage bias arrangement may be employed that is equivalent to the DC base voltage bias arrangement illustrated in FIG. 5.

For some applications it may be possible for auxiliary recharge to be the sole mechanism for supplying current to the IC charge reservoir capacitor $C_{AUX}$. This enables the auxiliary winding to be omitted from the transformer Tx, and is illustrated in FIG. 6.

Figure 6:
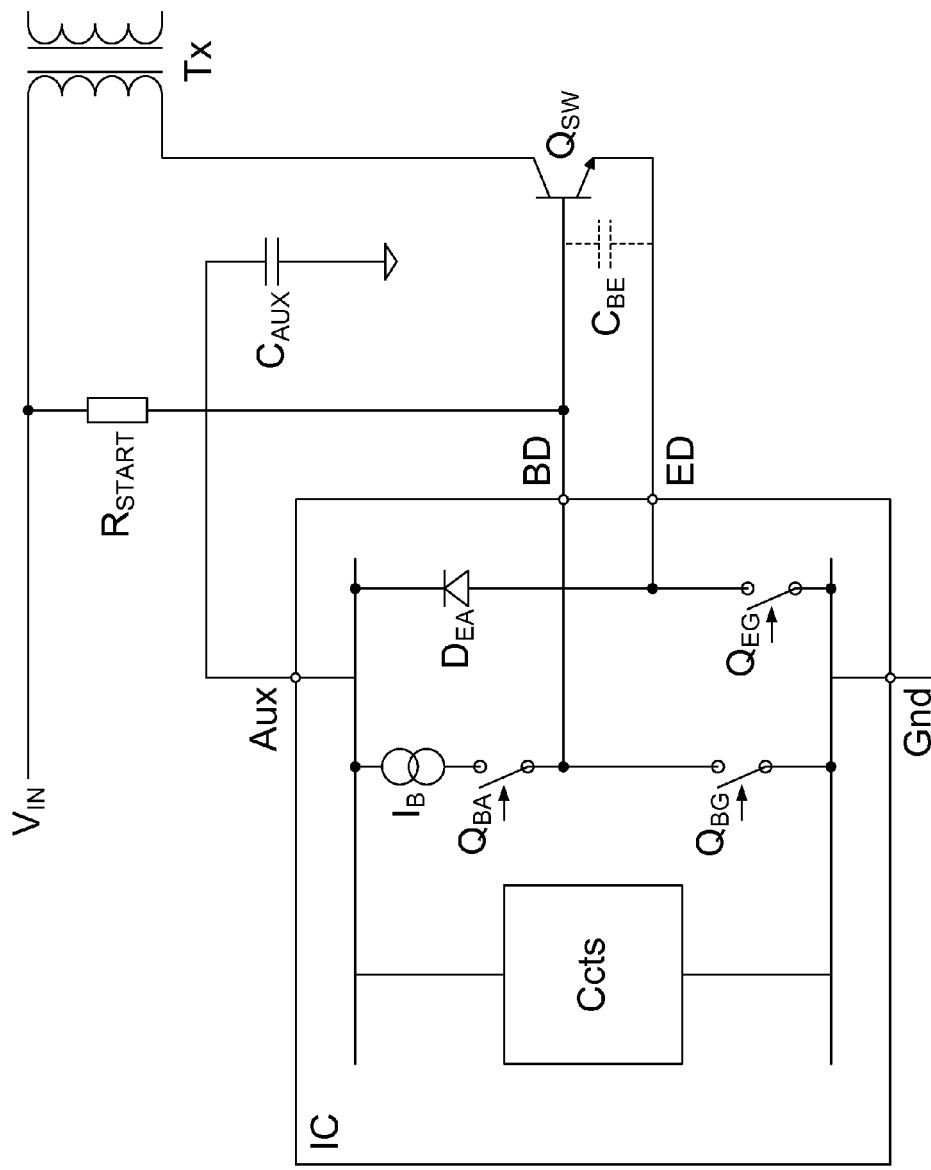
FIG. 6 shows a circuit schematic of an embodiment lacking an auxiliary winding on the transformer Tx.

The embodiment of FIG. 6 advantageously allows cost and space savings, and avoids design and electromagnetic interference issues, associated with the omitted auxiliary winding and the diode $D_{AUX}$. It may also be possible to place the reservoir capacitor $C_{AUX}$ inside the IC. This may eliminate discrete capacitor $C_{AUX}$ and dedicated IC terminal Aux, which may be used for another function or omitted entirely.

Figure 7A:
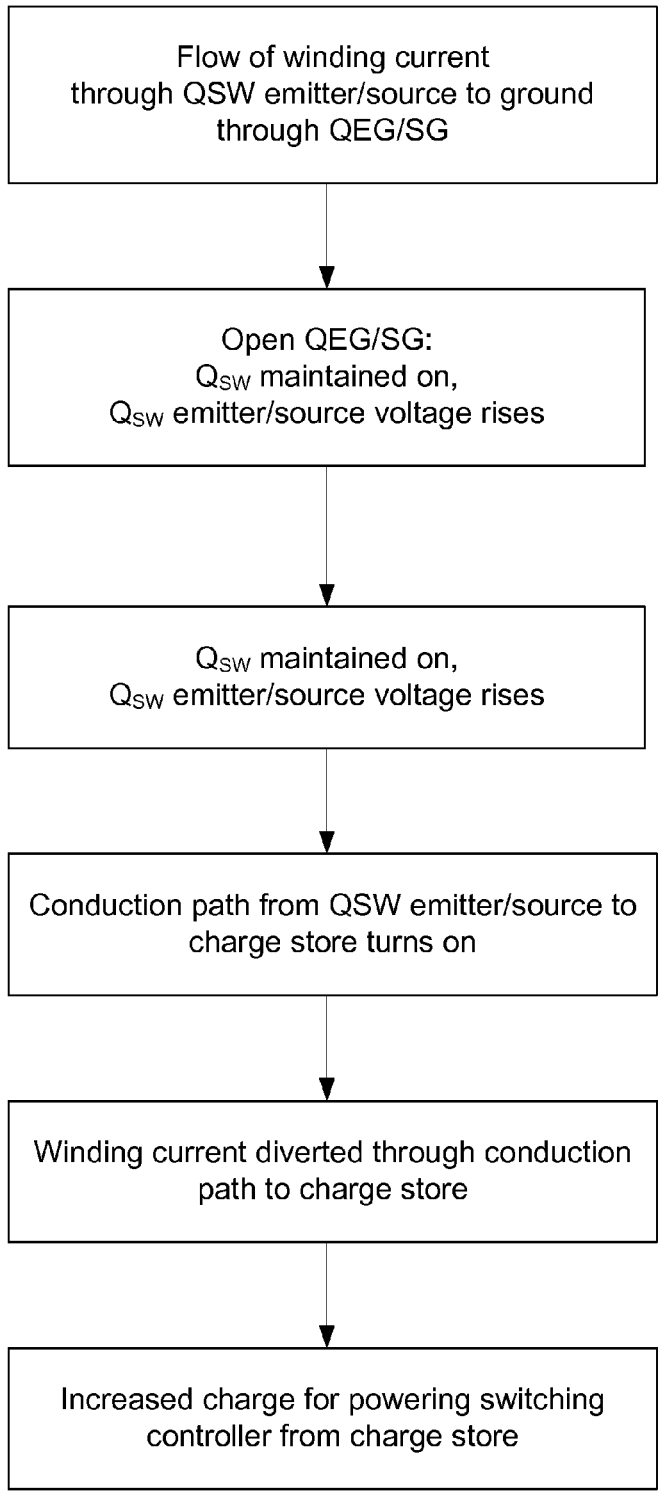
FIG. 7a shows a flow diagram of a control method of an embodiment.

FIG. 7a shows a method which may be implemented in any of the above, or other, embodiments. Preferably the method comprises a control procedure wherein the switches $Q_{BA}$, $Q_{BG}$, $Q_{EG}$ and/or $Q_{SW}$ (or $Q_{GA}$, $Q_{GG}$, $Q_{SG}$ and/or $Q_{SW}$ as appropriate) are controlled by a controller such as the switching controller (shown as an IC in FIGS. 1, 2, 5) to implement the method. Such control may further comprise controlling a switch that is provided additionally or alternatively to the diode $D_{EA}$ ($D_{SA}$) to turn the conduction path to the charge store on.

Figure 7B:
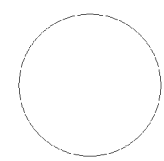
FIG. 7b shows a disc carrying code for controlling the switches of an embodiment to enable the provision of power to the charge store in an embodiment.

The invention further provides processor control code to implement the above-described embodiments, for example the above-mentioned control procedure, for example on an embedded processor that is preferably provided with or forms the switching controller. The code may be provided on a carrier such as a disk (as shown in FIG. 7b), CD- or DVD-ROM, programmed memory such as read-only memory (Firmware), or on a data carrier such as an optical or electrical signal carrier. Code (and/or data) to implement embodiments of the invention may comprise source, object or executable code in a conventional programming language (interpreted or compiled) such as C, or assembly code, code for setting up or controlling an ASIC (Application Specific Integrated Circuit) or FPGA (Field Programmable Gate Array), or code for a hardware description language such as Verilog (Trade Mark) or VHDL (Very high speed integrated circuit Hardware Description Language). As the skilled person will appreciate such code and/or data may be distributed between a plurality of coupled components in communication with one another.

Generally speaking, control of $V_{Aux}$ in the manner described may be particularly advantageous in relation to one or more of the following:

Start-up: auxiliary recharge may allow charge to be added to $C_{Aux}$ in every switching cycle, providing sufficient IC bias power before the output and bias winding voltages rise. This may ease the balance of initial $C_{Aux}$ charge and start-up ability of conventional converters, particularly when driving a load having high input capacitance. Alternatively or additionally, auxiliary recharge may enable the use of a higher start-up resistor $R_{START}$ and/or a smaller reservoir capacitor $C_{Aux}$. This may reduce power dissipation in $R_{START}$ and/or start-up time; and/or Low impedance load: auxiliary recharge may provide IC bias power when the steady state output and bias winding voltages approach zero, allowing converter output current control to be maintained. This may even be possible in output short circuit conditions.

No doubt many other effective alternatives will occur to the skilled person. It will be understood that the invention is not limited to the described embodiments and encompasses modifications apparent to those skilled in the art lying within the spirit and scope of the claims appended hereto.

What is claimed is:

1. A method of providing power to a switching controller of a switch mode power converter (SMPC), the SMPC having:
an inductive component having a winding coupled to receive power from an input to said SMPC;
a switching circuit comprising first and second switching transistors, said first transistor coupled in series between said winding and said second transistor;
a switching controller to control switching of said second transistor; and
a charge store to provide power to said switching controller,
the method comprising:
establishing a flow of current from said winding through said first transistor; and
diverting said current through a conduction path to said charge store.

2. The method of claim 1, comprising inhibiting receiving on a control line of said first transistor a bias signal, said bias signal for outputting a charge to said first transistor.

3. The method of claim 1, wherein said flow and diverting are during a switching cycle of said switching circuit, said switching cycle for allowing outputting of said power for said output voltage to said load.

4. The method of claim 1, wherein the first transistor stores charge to maintain said first transistor on during said diverting said current flow.

5. The method of claim 1, wherein a capacitor external to the first transistor stores charge to maintain said first transistor on during said diverting said current flow.

6. The method of claim 1, wherein a bias circuit connected to a control line of said first transistor maintains said first transistor on during said diverting said flow of current.

7. The method of claim 1, wherein said diverting comprises turning said conduction path on to conduct said current through said conduction path to said charge store.

8. The method of claim 1, wherein said diverting comprises:
decoupling a reference voltage line from said conduction path, to thereby allow flow of said current through said conduction path to said charge store.

9. The method of claim 8, wherein said decoupling comprises switching said second transistor off while said first transistor is on.

10. The method of claim 1, wherein at least the first transistor is a bipolar transistor, and wherein said diverting comprises diverting emitter current of the bipolar transistor to flow through the conduction path to the charge store.

11. The method of claim 1, wherein said at least the first transistor is a field effect transistor (FET), and wherein said diverting comprises diverting source current of the FET to flow through the conduction path to the charge store.

12. Method of claim 1, wherein the inductive component is a transformer or coupled inductor, the method comprising charging said charge store from an auxiliary winding of said transformer or coupled inductor.

13. The method of claim 1, wherein said switching controller controls switching of said first transistor.

14. A non-transitory storage medium storing instructions to cause a programmable processing apparatus to become operable to perform the method of claim 1.

15. A charging circuit for supplying charge to a charge store for providing power to a switching controller of a switch mode power converter (SMPC), the SMPC comprising:
an inductive component having a winding coupled to receive power from an input to said SMPC;
a switching circuit comprising first and second switching transistors, said first transistor coupled in series between said winding and said second transistor and to receive a winding current wherein said winding current is a current derived from said winding;
a switching controller to control switching of said second transistor; and
a charge store coupled to provide power to said switching controller, the charging circuit comprising:
a current diversion circuit to conduct a said winding current from the first transistor to said charge store; and
said second transistor arranged to controllably decouple a reference voltage line from said current diversion circuit to allow said winding current to flow through said current diversion circuit to said charge store.

16. The charging circuit of claim 15, comprising a bias decoupling switch to controllably decouple a control line of said first transistor from a bias output line, said bias output line for outputting a charge to said first transistor.

17. The charging circuit of claim 16, wherein the first transistor is arranged to store charge for delaying turn-off of the first transistor when the control line of said first transistor is decoupled from the bias output line by said bias decoupling switch such that the first transistor conducts said winding current to said current diversion circuit.

18. The charging circuit of claim 16, wherein a capacitor external to the first transistor is arranged to store charge for delaying turn-off of the first transistor when the control line of said first transistor is decoupled from the bias output line by said bias decoupling switch such that the first transistor conducts said winding current to said current diversion circuit.

19. The charging circuit of claim 15, wherein said current diversion circuit comprises a semiconductor junction configured to conduct said diverted winding current when forward-biased.

20. The charging circuit of claim 15, wherein said current diversion circuit comprises a switch operable to turn on to conduct said diverted winding current.

21. The charging circuit of claim 15, wherein at least the first transistor is a bipolar transistor, and wherein:
said second transistor is operable to decouple the bipolar transistor emitter terminal from the reference voltage line while the bipolar transistor is on, to thereby divert emitter current of the bipolar transistor through the current diversion circuit to the charge store.

22. The charging circuit of claim 15, wherein at least the first transistor is a field effect transistor (FET), and wherein:
said second transistor is operable to decouple the FET source terminal from the reference voltage line while the FET is on, to thereby divert source current of the FET through the current diversion circuit to the charge store.

23. SMPC comprising the charging circuit of claim 15.

24. The SMPC of claim 23, wherein the inductive component comprises a transformer or coupled inductor and said charge store comprises a capacitor configured to receive charge from an auxiliary winding of said transformer or coupled inductor.

25. The SMPC of claim 23, wherein the SMPC is a forward, flyback, buck, boost or buck-boost converter.

26. A charging circuit for supplying charge to a charge store for providing power to a switching controller of a switch mode power converter (SMPC), the SMPC having:
- an inductive component having a winding coupled to receive power from an input to said SMPC;
- a switching circuit comprising first and second switching transistors, said first transistor coupled in series between said winding and said second transistor;
- a switching controller to control switching of said second transistor; and
- a charge store to provide power to said switching controller, the charging circuit comprising:
- means for conducting current from said winding through said first transistor; and
- means for diverting said current through a conduction path to said charge store.

27. The charging circuit of claim 26, the charging circuit comprising means for inhibiting receiving on a control line of said first transistor a bias signal for outputting charge to said first transistor.

28. The charging circuit of claim 27, wherein said means for conducting current is for conducting current from said winding through said first transistor during said inhibiting.

29. SMPC comprising the charging circuit of claim 26.

30. A non-transitory storage medium storing code operable to control transistor switching to enable charging of a charge store to power a switching controller of a switch mode power converter (SMPC), the SMPC comprising primary and secondary transistors and a winding, the secondary transistor coupled between the primary transistor and a reference voltage, the code to, when running, control the primary and secondary transistors on to allow conduction of a current from the winding to the reference voltage; then turn off the secondary transistor while allowing the primary transistor to remain on, to thereby allow diverting of current from said primary transistor through a conduction path to a said charge store.

* * * * *